US012651932B2

(12) United States Patent
Jeong et al.

(10) Patent No.: US 12,651,932 B2
(45) Date of Patent: Jun. 9, 2026

(54) FOREIGN OBJECT DETECTION BASED ON TRANSMITTER INPUT PARAMETER

(71) Applicant: Renesas Electronics America Inc., Milpitas, CA (US)

(72) Inventors: Chan Young Jeong, San Jose, CA (US); Tao Qi, San Diego, CA (US); Young Chul Ryu, San Jose, CA (US); Kwangmuk Choi, Cupertino, CA (US); Pooja Agrawal, Milpitas, CA (US); Krishal Jaswantsinh Solanki, Santa Clara, CA (US); Adnan Dzebic, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/821,148

(22) Filed: Aug. 30, 2024

(65) Prior Publication Data

US 2024/0429754 A1 Dec. 26, 2024

Related U.S. Application Data

(63) Continuation of application No. 17/883,948, filed on Aug. 9, 2022, now Pat. No. 12,100,972.

(60) Provisional application No. 63/277,684, filed on Nov. 10, 2021.

(51) Int. Cl.
| | |
|---|---|
| *H02J 50/60* | (2016.01) |
| *H02J 50/10* | (2016.01) |
| *H02J 50/80* | (2016.01) |

(52) U.S. Cl.
CPC .............. *H02J 50/60* (2016.02); *H02J 50/10* (2016.02); *H02J 50/80* (2016.02)

(58) Field of Classification Search
CPC ........ B60L 53/12; B60L 53/124; H02J 50/10; H02J 50/12; H02J 50/60; H02J 50/80
See application file for complete search history.

(56) References Cited

U.S. PATENT DOCUMENTS

| | | | | |
|---|---|---|---|---|
| 2016/0064952 A1* | 3/2016 | Matsumoto | ............. | H02J 50/60 |
| | | | | 307/104 |
| 2017/0018977 A1* | 1/2017 | Van Wageningen | .... | H02J 50/80 |
| 2018/0262049 A1* | 9/2018 | Ikefuji | ..................... | H02J 50/12 |
| 2018/0262062 A1* | 9/2018 | Kato | ........................ | H02J 50/12 |
| 2019/0074731 A1* | 3/2019 | Lee | .......................... | H02J 50/12 |
| 2019/0386522 A1* | 12/2019 | Park | ........................ | H02J 50/60 |
| 2020/0094697 A1* | 3/2020 | Nagata | ..................... | H02J 50/80 |
| 2020/0212725 A1* | 7/2020 | Van Wageningen | .... | H02J 50/12 |
| 2020/0350788 A1* | 11/2020 | Park | ........................ | H02J 50/20 |

(Continued)

*Primary Examiner* — Levi Gannon
(74) *Attorney, Agent, or Firm* — SCULLY, SCOTT, MURPHY & PRESSER, P.C.

(57) ABSTRACT

Systems, apparatuses, and methods for detecting a foreign object on a wireless power charging region are described. A circuit can detect an object inductively coupled to a wireless power transmitter. The circuit can further measure an input parameter prior to a power transfer stage, the input parameter can be one of an input current and an input power. The circuit can further compare the measured input parameter with a predetermined value. The circuit can further determine whether the object is a foreign object or the wireless power receiver based on a result of the comparison between the measured input parameter with the predetermined value.

6 Claims, 7 Drawing Sheets

(56)               References Cited

U.S. PATENT DOCUMENTS

| 2021/0119494 A1* | 4/2021 | Mao ........................ | H02J 50/60 |
| 2021/0138917 A1* | 5/2021 | Kanakasabai .......... | G01V 3/101 |
| 2022/0149667 A1* | 5/2022 | Yang ....................... | H02J 50/60 |
| 2023/0384471 A1* | 11/2023 | Kanakasabai ........... | H02J 50/80 |

* cited by examiner

500

502    Detect an object in a charging region

504    Measure input parameter

506    Compare the measured input parameter with a predetermined value

508    Determine whether a foreign object is present or absent in the charging region based on a result of the comparison between the measured input parameter with the predetermined value

600

602  Detect an object in a charging region

604  Measure input parameter

606  Compare the measured input parameter with a predetermined pattern

608  Determine whether whether a foreign object is present or absent in the charging region based on a result of the comparison between the measured input parameter with the predetermined pattern

700

702 — Detect an object in a charging region

704 — Measure input parameter

706 — Compare the measured input parameter with a fixed value of the input parameter 708 — Determine whether a foreign object is present or absent in the charging region based on a result of the comparison between the measured input parameter with the fixed value of the input parameter

FOREIGN OBJECT DETECTION BASED ON TRANSMITTER INPUT PARAMETER

CROSS-REFERENCE TO RELATED APPLICATIONS

This application is a continuation of U.S. application Ser. No. 17/883,948 filed on Aug. 9, 2022, which claims the benefit of U.S. Provisional Application No. 63/277,684 filed on Nov. 10, 2021, the entire contents of each of which are incorporated herein by reference.

BACKGROUND OF THE SPECIFICATION

The present disclosure relates in general to integrated circuit devices in wireless power systems and, more particularly, to foreign object detection based on input parameters.

A wireless power system can include a transmitter having a transmission coil and a receiver having a receiver coil. In an aspect, the transmitter may be connected to a structure including a wireless charging region. In response to a device including the receiver being placed on the charging region, or in proximity to the charging region, the transmission coil and the receiver coil can be inductively coupled with one another to form a transformer that can facilitate inductive transfer of alternating current (AC) power. The transfer of AC power, from the transmitter to the receiver, can facilitate charging of a battery of the device including the receiver.

SUMMARY

In one embodiment, a semiconductor device for wireless power transmitter is generally described. The semiconductor device can include a driver circuit configured to drive a transmitter coil to provide wireless power to a wireless power receiver. The semiconductor device can further include a wireless power transmitter coupled to the driver circuit and configured to control the driver circuit. The wireless power transmitter can be configured to detect an object inductively coupled to a wireless power transmitter. The wireless power transmitter can be further configured to, prior to a power transfer stage between the wireless power transmitter and the wireless power receiver, measure an input parameter, the input parameter being one of an input current and an input power. The wireless power transmitter can be further configured to compare the measured input parameter with a predetermined value. The wireless power transmitter can be further configured to determine whether the object is a foreign object or the wireless power receiver based on a result of the comparison between the measured input parameter with the predetermined value.

In one embodiment, an apparatus for wireless power transmitter is generally described. The apparatus can include an integrated circuit. The integrated circuit can be configured to detect an object inductively coupled to a wireless power transmitter. The integrated circuit can be further configured to, prior to a power transfer stage between the wireless power transmitter and the wireless power receiver, measure an input parameter, the input parameter being one of an input current and an input power. The integrated circuit can be further configured to compare the measured input parameter with a predetermined value. The integrated circuit can be further configured to determine whether the object is a foreign object or the wireless power receiver based on a result of the comparison between the measured input parameter with the predetermined value.

In one embodiment, a method for operating a wireless power transmitter is described. The method can include detecting, by an integrated circuit, an object inductively coupled to a wireless power transmitter. The method can further include, prior to a power transfer stage between the wireless power transmitter and the wireless power receiver, measuring, by the integrated circuit, an input parameter, the input parameter being one of an input current and an input power. The method can further include comparing, by the integrated circuit, the measured input parameter with a predetermined value. The method can further include determining, by the integrated circuit, whether the object is a foreign object or the wireless power receiver based on a result of the comparison between the measured input parameter with the predetermined value.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In wireless charging applications and systems, prior to AC power transfer, the receiver can communicate messages to the transmitter to verify an identity of the receiver. The transmitter can begin the power transfer in response to verifying the identity of the receiver. During power transfer, foreign objects that may be in proximity to the transmission coil may cause an increase in power loss, and the foreign object may heat up to a point that can potentially create a hazardous situation.

The methods and systems described herein can provide a feature of foreign object detection before a power transfer stage without a need to add additional circuit components for injecting current or voltage to oscillate a transmission coil. Further, the foreign object detection described herein can be integrated as an additional feature to existing foreign object detection features without a need to add additional hardware or circuit components.

Figure 1:
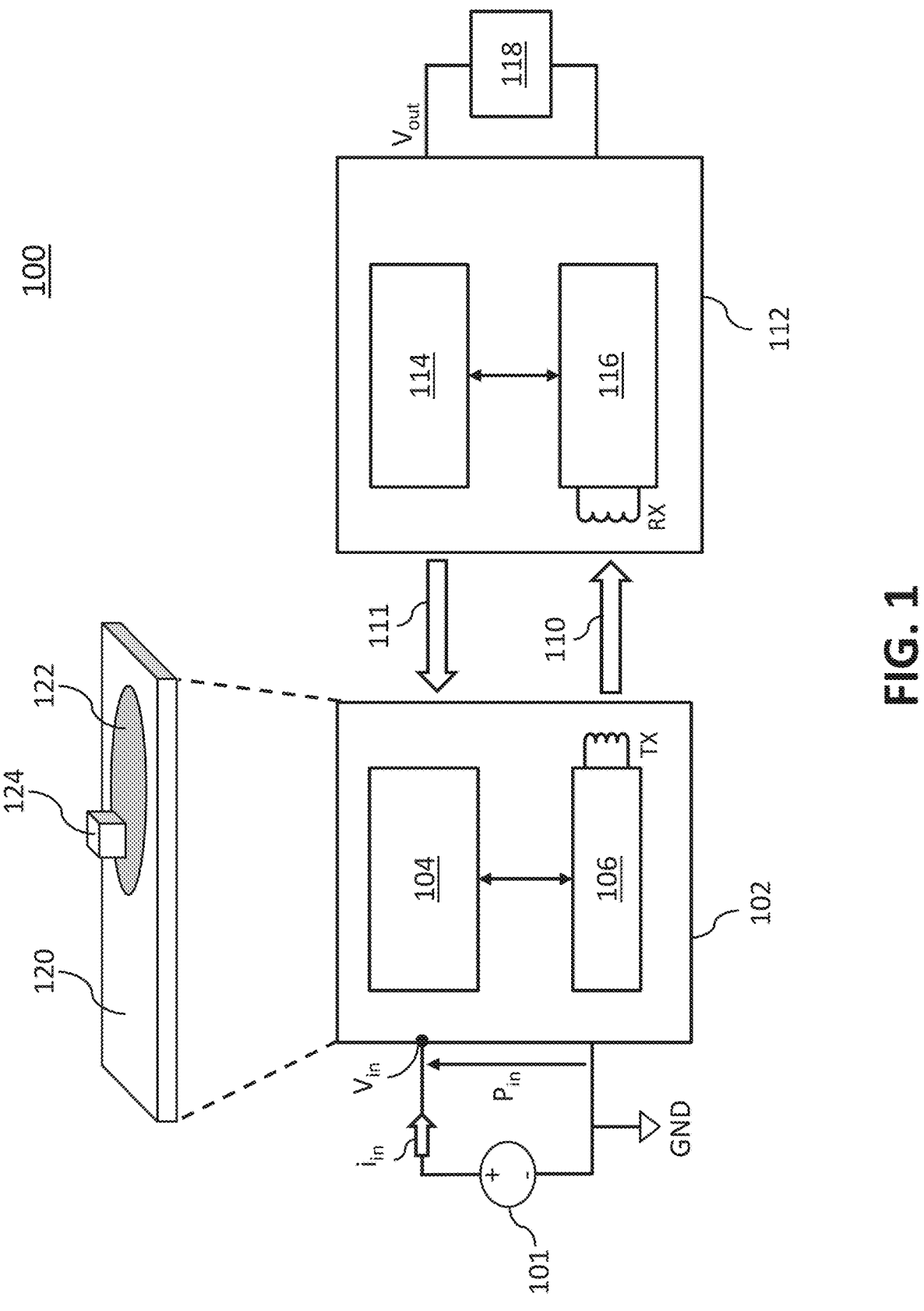
FIG. 1 is a diagram showing an example system that can implement foreign object detection based on transmitter input parameter in one embodiment.

FIG. 1 is a diagram showing an example system 100 that can implement foreign object detection based on transmitter input parameter in one embodiment. The system 100 can be a wireless charging system that can facilitate wireless transfer of power and/or wireless transmission of data. The system 100 can include a transmitter 102 and a receiver 112 configured to be in communication with each other. The transmitter 102 can be a wireless power transmitter connected to a direct current (DC) power supply 101 that supply input power Pin, and can transmit alternating current (AC) power from the connected DC power supply 101. The transmitter 102 can include, or be coupled to, a controller 104 and a power driver 106. The power driver 106 can include a coil, labeled as TX. In one embodiment, controller 104 can be implemented by an integrated circuit. The controller 104 can be configured to control and operate the power driver 106. In an example, the controller 104 can be configured to control an input voltage $V_{in}$ being supplied to power driver 106, and can control the power driver 106 to drive the Coil TX to produce a magnetic field. In one embodiment, one or more of transmitter 102, controller 104, and/or power driver 106 can be packaged as a semiconductor device. The power driver 106 can drive the Coil TX at a range of frequencies and configurations defined by wireless power standards, such as the Wireless Power Consortium (Qi) standard, the Power Matters Alliance (PMA) standard, and/or the Alliance for Wireless Power (A for WP, or Rezence) standard.

The receiver 112 can be a wireless power receiver that can be located in, for example, a computing device, a mobile phone, a tablet device, a wearable device, and/or other electronic devices that can be configured to receive power wirelessly. The receiver 112 can include a controller 114 and a power rectifier 116. The power rectifier 116 can include a coil, labeled as RX. The magnetic field produced by the Coil TX of the power driver 106 can induce a current in the Coil RX of the power rectifier 116. The induced current can cause an amount of AC power 110 to be inductively transmitted from the power driver 106 to the power rectifier 116. The power rectifier 116 can receive the AC power 110 and convert the AC power 110 into DC power having an output voltage $V_{out}$, and can provide the output voltage $V_{out}$ to a load 118. The load 118 can be, for example, a battery charger configured to charge a battery, a DC-DC converter configured to supply a processor or a display, and/or other electronic components that requires the DC power to operate.

The transmitter 102 can be connected to a charger dock surface 120. The charger dock surface can include a charging region 122. The Coil TX can be in proximity to the charging region 122 such that a device being placed on the charging region 122 can receive the AC power 110 from the transmitter 102. The transmitter 102 can be configured to monitor the charging region 122 of the charger dock surface 120 to detect if objects are being placed in the charging region 122 or removed from the charging region 122. In response to detecting an object in the charging region 122, the transmitter 102 can send a digital pulse and can listen for a response to determine if the object includes a receiver that can receive the AC power 110.

In the example shown in FIG. 1, if transmitter 102 detects the receiver 112 is placed on the charging region 122, the transmitter can proceed to an identification stage. In response to the receiver 112 being placed on the charging region 122, the Coil TX and the Coil RX may be within a distance with one other that is close enough to inductively coupled and form a transformer. The identification stage can include identifying the receiver 112 and obtaining configuration information 111 to create a power contract with the receiver 112. In response to creating the power contract, the transmitter 102 can begin the power transfer stage to transfer the AC power 110 to the receiver 112. To create the power contract, the receiver 112 may send communication packets indicating power transfer information such as, for example, an amount of power to be transferred to the receiver 112, commands to increase, decrease, or maintain a power level of the AC power 110, commands to stop a power transfer, etc. The power contract between the transmitter 102 and the receiver 112 may include these power transfer information.

In an aspect, when the system 100 is not in the power transfer stage, the receiver 112 may be disconnected from the load 118. In response to the receiver 112 being disconnected from the load 118, the load 118 is not drawing current or power from the receiver 112 (e.g., $Vo_{ut}$ can be zero). Since the load 118 is not drawing power from the receiver 112, the amount of current or power drawn by the receiver 112 from the transmitter 102, and the amount of current ($i_{in}$) or power ($P_{in}$) drawn by the transmitter 102 from the DC power supply 101, may be reduced. Note that the input voltage $V_{in}$ may remain constant even if $i_{in}$ and $P_{in}$ changes. The current ($i_{in}$) and power ($P_{in}$) can reflect a coupling condition between the Coil TX and another object, such as the Coil RX or a conductive object such as metal. For example, the current ($i_{in}$) and power ($P_{in}$) can be higher when there is an object on the charging region 122 than when there is only Coil RX coupled to the Coil TX (e.g., in non-power transfer stage or when load 118 is disconnected from the receiver 112).

To be described in more detail below, the controller 104 of the transmitter 102 can be configured to monitor the current ($i_{in}$) or power ($P_{in}$) being received by the transmitter 102. When the system 100 is not in the power transfer stage, such as when the system is in the identification stage, the controller 104 can monitor any changes in current ($i_{in}$) or power ($P_{in}$) to detect whether a foreign object 124 is present or absent on the charging region 122 (or inductively coupled with the Coil TX) or not. For example, the controller 104 can detect an increase in current ($i_{in}$) or power ($P_{in}$) and, in response, determine that the Coil TX may have inductively coupled with a candidate object that may or may not be a foreign object. In an aspect, a foreign object can be a non-receiver that is brought into the range of the transmitter 102 (or Coil TX) and causes unwanted current (and/or heat) to be induced. These non-receivers can also be referred to as parasitic loads. The controller 104 can be configured to compare the detected increased value of current ($i_{in}$) or power ($P_{in}$) with a static or predetermined value to determine whether the candidate object inductively coupled to the Coil TX is the Coil RX, or the foreign object 124 (or whether foreign object 124 is present or absent on charging region 122). In one or more embodiments, the foreign object detection being performed by the transmitter 102 can be performed regardless of whether the receiver 112 is identified or verified in the identification stage.

If the increased value of current ($i_{in}$) or power ($P_{in}$) is greater than the predetermined value, then the Coil TX may be inductively coupled to the foreign object 124. If the increased value of the input current ($i_{in}$) or the input power ($P_{in}$) is equal to or less than the predetermined value, then the Coil TX may be inductively coupled to the Coil RX. In another embodiment, if a difference between the increased value of the input current ($i_{in}$) or the input power ($P_{in}$) and the predetermined value is within a threshold range, then the Coil TX may be inductively coupled to the Coil RX. In response to the controller 104 determining that the Coil TX may be inductively coupled to the foreign object 124, the controller 104 may not proceed to the power transfer stage. In response to the controller 104 determining that the Coil TX may be inductively coupled to the Coil RX, the controller 104 may proceed to the power transfer stage.

By using the input current ($i_{in}$) or the input power ($P_{in}$) to perform foreign object detection, the system 100 can detect foreign objects on the charging region 122 without a need to add additional circuit components to the transmitter 102. For example, coil quality factor detection function which requires circuit components for injecting voltage or current to oscillate the Coil TX may not be needed if the system 100 can perform foreign object detection using current ($i_{in}$) or power ($P_{in}$) before the power transfer stage.

Figure 2:
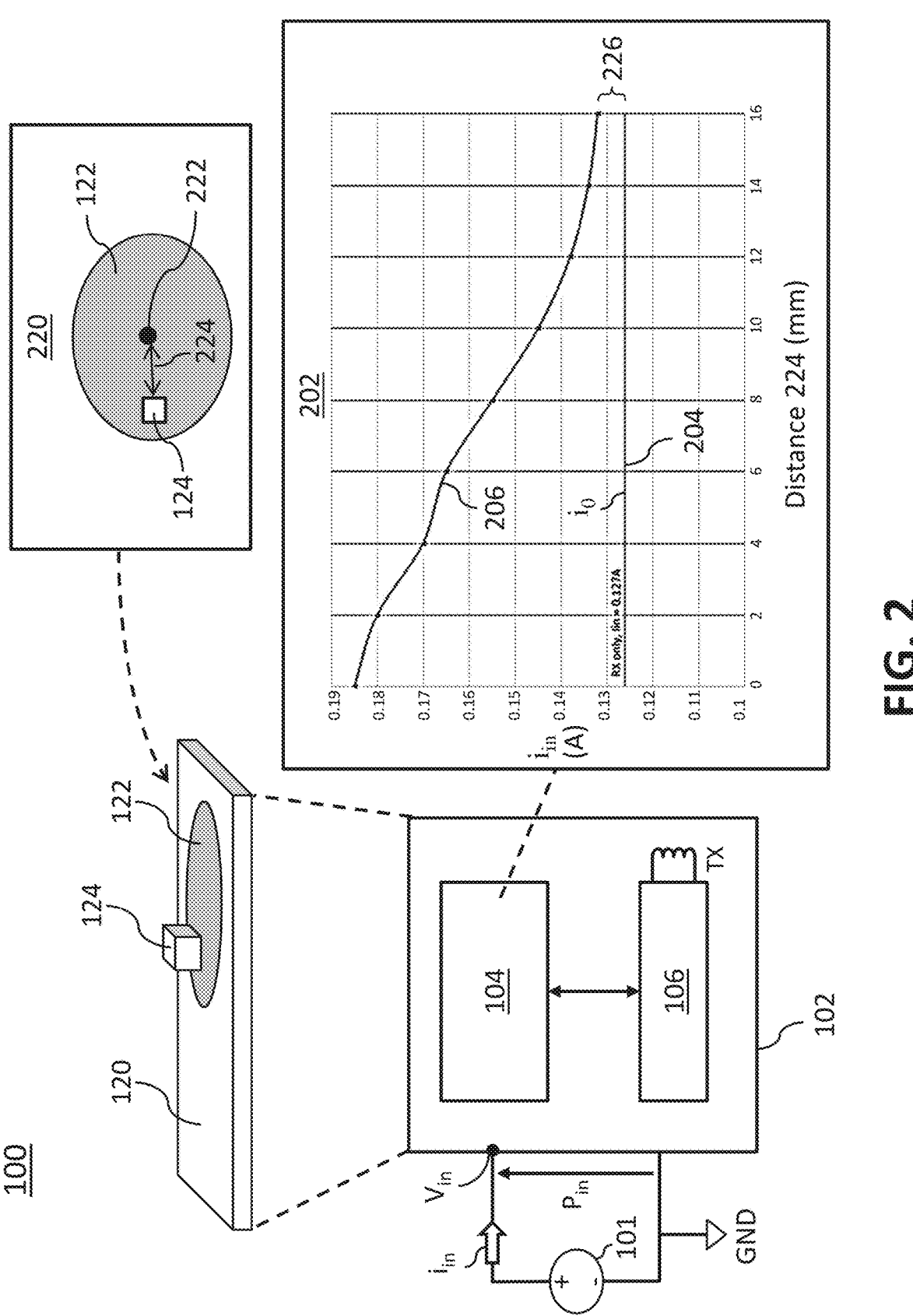
FIG. 2 is a diagram showing an example implementation of the example system 100 of FIG. 1 in one embodiment.

FIG. 2 is a diagram showing an example implementation of the example system 100 of FIG. 1 in one embodiment. In one embodiment, the controller 104 can be configured to perform an input parameter test 202 before the power transfer stage. A result of the input parameter test 202 can indicate how an input parameter, such as input current ($i_{in}$) or input power ($P_{in}$), varies with a misalignment or distance 224 between a location of any foreign object (e.g., foreign object 124) and a reference point 222 on the charging region 122. The reference point 222 can be a center of the charging region 122, a predetermined reference location on the charging region 122, or a predetermined reference point on the transmitter 102, etc. FIG. 2 shows a top perspective view 220 of the charging region 122. Different locations of the foreign object 124 on the charging region 122 can change the distance 224.

As shown in FIG. 2, a known pattern, or curve 204, shows that if the Coil TX is inductively coupled with the RX coil only (before the power transfer stage), and if there is no foreign object on charging region 122, the input current ($i_{in}$) can be fixed at $i_0$=0.127 amperes (A) and may not be varying. If an input current measured by transmitter 102 (or controller 104) is the fixed input current $i_0$ then there is no foreign object interfering with the magnetic field between the Coil TX and the Coil RX. If any foreign object is within the charging region 122 (e.g., foreign object 124), then the input current ($i_{in}$) can deviate from fixed input current $i_0$. An amount of deviation from the fixed input current $i_0$ can vary as the distance 224 varies. In other words, the location of the foreign object 124 with respect to the reference point 222 on the charging region 122 can change the amount of deviation of the input current from the fixed input current $i_0$. The fixed input current $i_0$ can be stored in a memory device of controller 104

The input parameter test 202 can further produce a curve 206 that indicates how the input parameter (e.g., input current $i_{in}$) varies with distance 224. In one embodiment, the input parameter test 202 can include measuring, by controller 104, the input current in response to placement of an arbitrary foreign object (e.g., foreign object 124 or other foreign object) at different locations and/or at different distances 224 on charging region 122. The input current corresponding to different values of distance 224 can be measured or recorded by controller 104. The measured input current indicated by curve 206 can be stored as a reference pattern in the memory device of controller 104.

In one embodiment, if a foreign object is within charging region 122, the input current ($i_{in}$) can be greater than $i_0$ and can vary inversely with distance 224. For example, curve 206 generated by the input parameter test 202 can indicate how the input current ($i_{in}$) varies with distance 224. As shown by the curve 206, as the distance 224 increases (e.g., from 0 millimeters (mm) to 16 mm), the input current ($i_{in}$)

decreases. If the distance 224 between the foreign object and the reference point 222 is at a maximum (e.g., at 16 mm, or at an edge of charging region 122), a difference between curves 204, 206 is still present, indicating that as long as there is a foreign object in the charging region 122, the input current ($i_{in}$) will remain different from the fixed input current $i_0$. In one embodiment, the fixed input current $i_0$ can be used as a predetermined value (or a static parameter, or a previously measured parameter), and if the input current ($i_{in}$) of the transmitter 102 is greater than this predetermined value, then a foreign object (e.g., foreign object 124) can be considered as being present on the charging region 122.

In one embodiment, if controller 104 detects an input current different from fixed input current $i_0$, then controller 104 can determine that there may be a foreign object within the charging region 122 and/or a location of the foreign object with response to reference point 222. For example, if controller 104 measures an input current of 0.16 A, controller 104 can determine that 0.16 A is different from the predetermined value of 0.127 A, and controller 104 can determine that there may be a foreign object located at approximately 7 mm away from reference point 222.

In one embodiment, controller 104 can determine a predetermined threshold range 226 based on curves 204, 206. For example, controller 104 can assign a difference between a minimum of curve 206 (e.g., the reference pattern) and a maximum of curve 204 (e.g., predetermined value or fixed input current $i_0$) as the predetermined threshold range 226. If a difference between the predetermined value (e.g., fixed input current $i_0$) and the input current ($i_{in}$) is within predetermined threshold range 226, then the transmitter 102 can determine that there may be no foreign object located in the charging region 122.

In another embodiment, the input parameter test 202 can produce an input parameter variation pattern indicating how the input power ($P_{in}$) varies with distance 224. The input power corresponding to different locations of the arbitrary foreign object on charging region 122 can be measured or recorded by controller 104. The measured input power can be stored in a memory device of controller 104 and can be used for producing the input power variation pattern.

Figure 3:
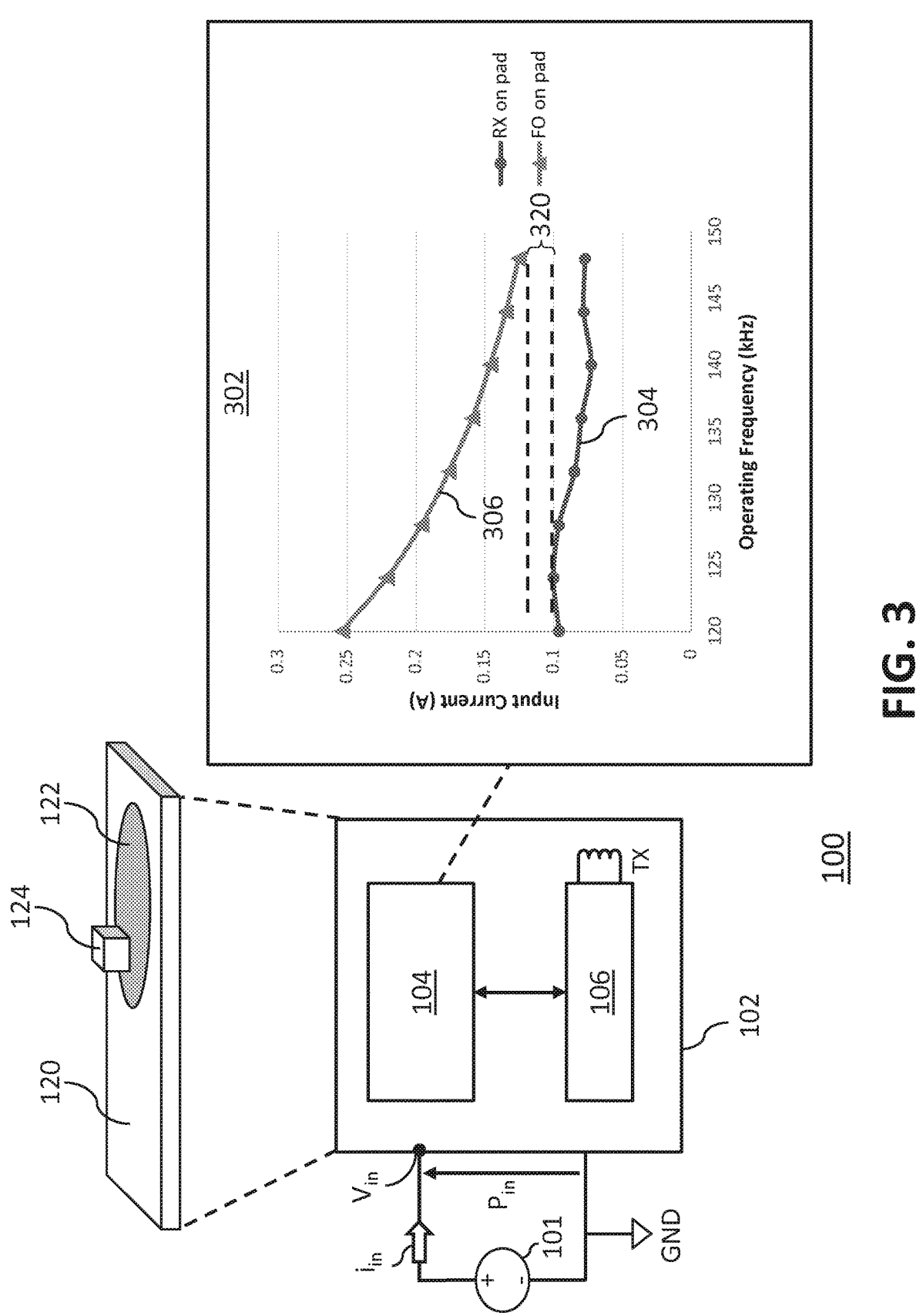
FIG. 3 is a diagram showing another example implementation of the example system 100 of FIG. 1 in one embodiment.

FIG. 3 is a diagram showing an example implementation of the example system 100 of FIG. 1 in one embodiment. In one embodiment, the controller 104 can be configured to perform an operating frequency test 302 before the power transfer stage. A result of the operating frequency test 302 can indicate how an input parameter, such as the input current ($i_{in}$) or the input power ($P_{in}$), being received by the transmitter 102 varies with an operating frequency of the transmitter 102. In FIG. 3, a known pattern, or curve 304, shows how the input current ($i_{in}$) varies with an operating frequency of the transmitter 102 in response to the Coil TX being inductively coupled with the RX coil only (before the power transfer stage) without foreign objects on charging region 122. If any foreign object is within the charging region 122 (e.g., foreign object 124), then the input current ($i_{in}$) can deviate from curve 304. An amount of deviation from curve 304 can vary as the operating frequency varies. The known pattern or curve 304 can be stored in a memory device of controller 104.

Operating frequency test 302 can further produce a curve 306 that indicates how the input parameter (e.g., input current $i_{in}$) varies with the operating frequency of transmitter 102. In one embodiment, the operating frequency test 302 can include measuring, by controller 104, the input current in response to different operating frequencies of transmitter 102 when an arbitrary foreign object (e.g., foreign object 124 or other foreign object) is placed on charging region 122. As shown by curve 306, if a foreign object is within charging region 122, the input current ($i_{in}$) can be greater than the input current values indicated by curve 304, and can vary inversely with the operating frequency of transmitter 102. The input current corresponding to different operating frequencies of transmitter 102 can be measured or recorded by controller 104. The measured input current indicated by curve 306 can be stored as a reference pattern in the memory device of controller 104.

In one embodiment, controller 104 can measure a first value of an input parameter (e.g., input current $i_{in}$ or input power $P_{in}$) and a second value of the input parameter. The first value of the input parameter can be a value when the operation frequency is a first operation frequency, and the second value of the input parameter can be a value when the operation frequency is a second operation frequency different from the first operation frequency. Controller 104 can determine whether an object in charging region 122 is a foreign object or a wireless power receiver based on the first value of the input parameter, the second value of the input parameter, the first operation frequency, and the second operation frequency. For example, controller 104 can determine whether the object in charging region 122 is a foreign object or a wireless power receiver by dividing a difference between the first value of the input parameter and the value of the second input parameter by a difference between the first operation frequency to the second operation frequency.

In one embodiment, one or more values among the curve 304 can be used as a predetermined value (or a static parameter, or a previously measured parameter), and if the input current ($i_{in}$) of the transmitter 102 is different from (e.g., greater than) this predetermined value, then controller 104 can determine that a foreign object is present on the charging region 122. In another embodiment, if a difference between the curve 304 and the input current is within a predetermined threshold range 320, then the transmitter 102 can determine that there may be no foreign object located in the charging region 122. A sensitivity of the foreign object detection can be adjusted by adjusting this predetermined threshold range.

In one embodiment, controller 104 can determine predetermined threshold range 320 based on curves 304, 306. For example, controller 104 can assign a difference between a minimum of curve 306 (e.g., the reference pattern) and a maximum of curve 304 (e.g., predetermined value) as the predetermined threshold range 320. If a difference between the predetermined value and the input current ($i_{in}$) is within predetermined threshold range 320, then the transmitter 102 can determine that there may be no foreign object located in the charging region 122.

In another embodiment, the operating frequency test 302 can produce an input parameter variation pattern indicating how the input power ($P_{in}$) varies with the operating frequency of transmitter 102. The input power corresponding to different operating frequencies of transmitter 102, with a foreign object on charging region 122, can be measured or recorded by controller 104. The measured input power can be stored in the memory device of controller 104 and can be used for producing the input power variation pattern.

Figure 4:
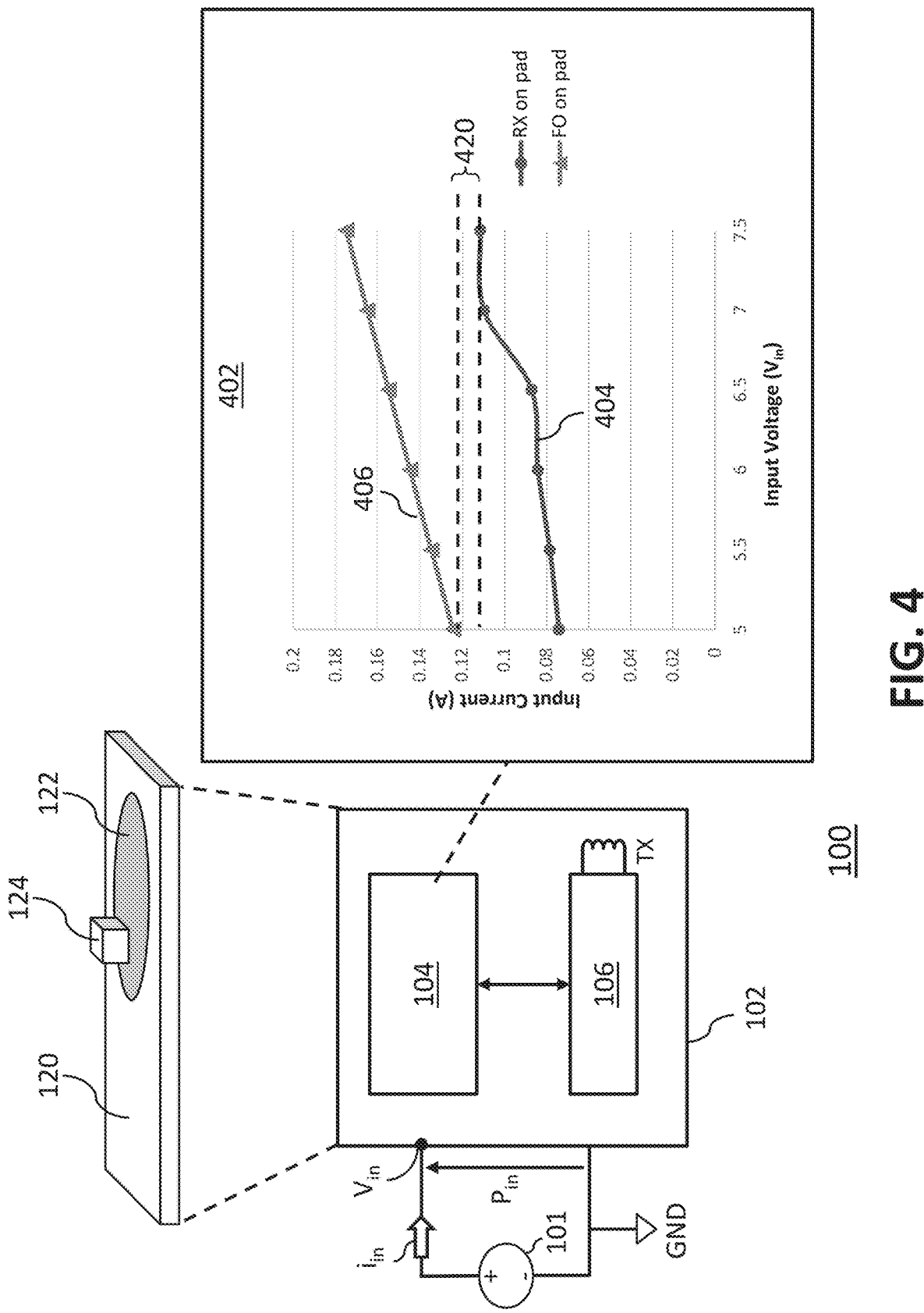
FIG. 4 is a diagram showing another example implementation of the example system 100 of FIG. 1 in one embodiment.

FIG. 4 is a diagram showing another example implementation of the example system 100 of FIG. 1 in one embodiment. In one embodiment, the controller 104 can be configured to perform an input voltage test 402 before the power transfer stage. A result of the input voltage test 402 can indicate how the input current ($i_{in}$) to the transmitter 102 varies with an input voltage, denoted as $V_{in}$, of the transmitter 102. In FIG. 4, a curve 404 shows how the input current ($i_{in}$) varies with the input voltage $V_{in}$ of the transmitter 102 in response to the Coil TX being inductively coupled with the RX coil only (before the power transfer stage). If any foreign object is within the charging region 122 (e.g., foreign object 124), then the input current ($i_{in}$) can deviate from curve 404. An amount of deviation from curve 304 can vary as the input voltage $V_{in}$ varies. The known pattern or curve 304 can be stored in a memory device of controller 104.

Input voltage test 402 can further produce a curve 406 that indicates how the input current ($i_{in}$) varies with input voltage $V_{in}$ of the transmitter 102 in response to a foreign object (e.g., foreign object 124) being located on the charging region 122 (before the power transfer stage). In one embodiment, the input voltage test 402 can include measuring, by controller 104, the input current in response to different values of input voltage $V_{in}$ when an arbitrary foreign object (e.g., foreign object 124 or other foreign object) is placed on charging region 122. As shown by curve 406, if a foreign object is within charging region 122, the input current ($i_{in}$) can be greater than the input current values indicated by curve 404, and can vary with input voltage $V_{in}$. The input current corresponding to different input voltages can be measured or recorded by controller 104. The measured input current indicated by curve 406 can be stored as a reference pattern in the memory device of controller 104.

In one embodiment, controller 104 can measure a first value of an input parameter (e.g., input current $i_{in}$ or input power $P_{in}$) and a second value of the input parameter. The first value of the input parameter can be a value when the input voltage $V_{in}$ is a first input voltage, and the second value of the input parameter can be a value when the input voltage $V_{in}$ is a second input voltage different from the first input voltage. Controller 104 can determine whether an object in charging region 122 is a foreign object or a wireless power receiver based on the first value of the input parameter, the second value of the input parameter, the first input voltage, and the second input voltage. For example, controller 104 can determine whether the object in charging region 122 is a foreign object or a wireless power receiver by dividing a difference between the first value of the input parameter and the value of the second input parameter by a difference between the first input voltage to the second input voltage.

In one embodiment, one or more values among the curve 404 can be used as a predetermined value (or a static parameter, or a previously measured parameter), and if the input current ($i_{in}$) of the transmitter 102 is different from (e.g., greater than) this predetermined value, then controller 104 can determine that a foreign object is present on the charging region 122. In another embodiment, if a difference between the curve 404 and the input current is within a predetermined threshold range, then the transmitter 102 can determine that there may be no foreign object located in the charging region 122. A sensitivity of the foreign object detection can be adjusted by adjusting this predetermined threshold range.

In one embodiment, controller 104 can determine predetermined threshold range 420 based on curves 404, 406. For example, controller 104 can assign a difference between a minimum of curve 406 (e.g., the reference pattern) and a maximum of curve 404 (e.g., predetermined value) as the predetermined threshold range 420. If a difference between the predetermined value and the input current ($i_{in}$) is within predetermined threshold range 320, then the transmitter 102 can determine that there may be no foreign object located in the charging region 122.

In another embodiment, the input voltage test 402 can produce an input parameter variation pattern indicating how the input power ($P_{in}$) varies with the input voltage $V_{in}$. The input power corresponding to different input voltages, with a foreign object on charging region 122, can be measured or recorded by controller 104. The measured input power can be stored in the memory device of controller 104 and can be used for producing the input power variation pattern.

Figure 5:
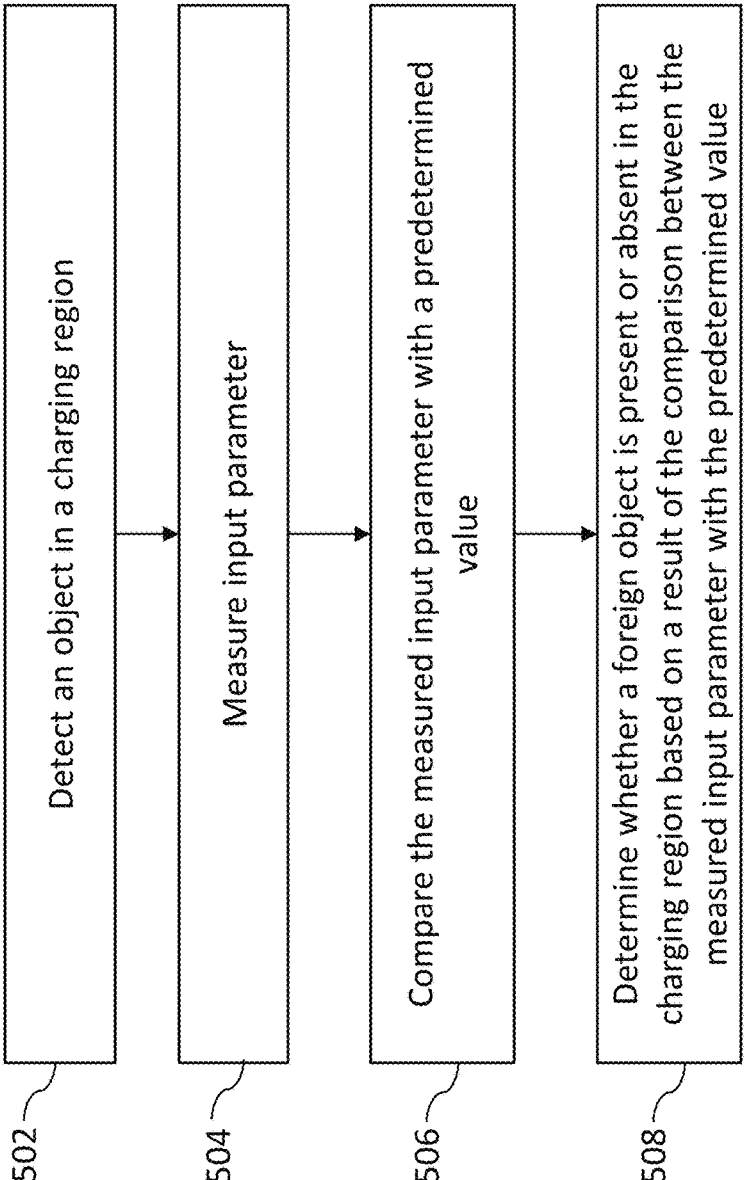
FIG. 5 is a flow diagram illustrating a process of implementing foreign object detection based on transmitter input parameter in one embodiment.

FIG. 5 is a flow diagram illustrating a process 500 being performed by a power transmitter to implement foreign object detection based on transmitter input parameter in one embodiment. The process 500 may include one or more operations, actions, or functions as illustrated by one or more of blocks 502, 504, 506, and/or 508. Although illustrated as discrete blocks, various blocks can be divided into additional blocks, combined into fewer blocks, eliminated, or performed in parallel, and/or performed in different order, depending on the desired implementation.

The process 500 can be performed by a wireless power transmitter (e.g., transmitter 102 in FIG. 1 to FIG. 3). In one embodiment, the blocks 502, 504, 506, and 508 can be performed prior to a power transfer stage between the wireless power transmitter and a wireless power receiver. The process 500 can begin at block 502. At block 502, the transmitter can detect an object in a charging region (e.g., charging region 122 in FIG. 1 to FIG. 4). In one embodiment, the transmitter can detect the object in the charging region by detecting the object being inductively coupled to the transmitter. The detection of the object can be performed in a stage that is different from a power transfer stage of the transmitter. The process 500 can proceed from block 502 to block 504. At block 504, the transmitter can measure an input parameter being received at an input terminal of the transmitter. In one embodiment, the input parameter can be one of an input current and an input power. The process 500 can proceed from block 504 to block 506. At block 506, the transmitter can compare the measured input parameter with a predetermined value, such as a predetermined threshold. In one embodiment, the threshold can be a range of values. The process 500 can proceed from block 506 to block 508. At block 508, the transmitter can determine whether a foreign object is present or absent in the charging region, or determine whether the object in charging region 122 is the foreign object or a wireless power receiver, based on a result of the comparison between the measured input parameter with the predetermined threshold. In response to the result of the comparison indicating the measured input parameter is outside of the threshold, the transmitter can determine that the object is the foreign object. In response to the result of the comparison indicating the measured input parameter is within the threshold, the transmitter can determine that the object is the receiver. In one embodiment, the transmitter can determine a reference pattern corresponding to the foreign object. The transmitter can determine the threshold range based on the reference pattern and the predetermined value.

Figure 6:
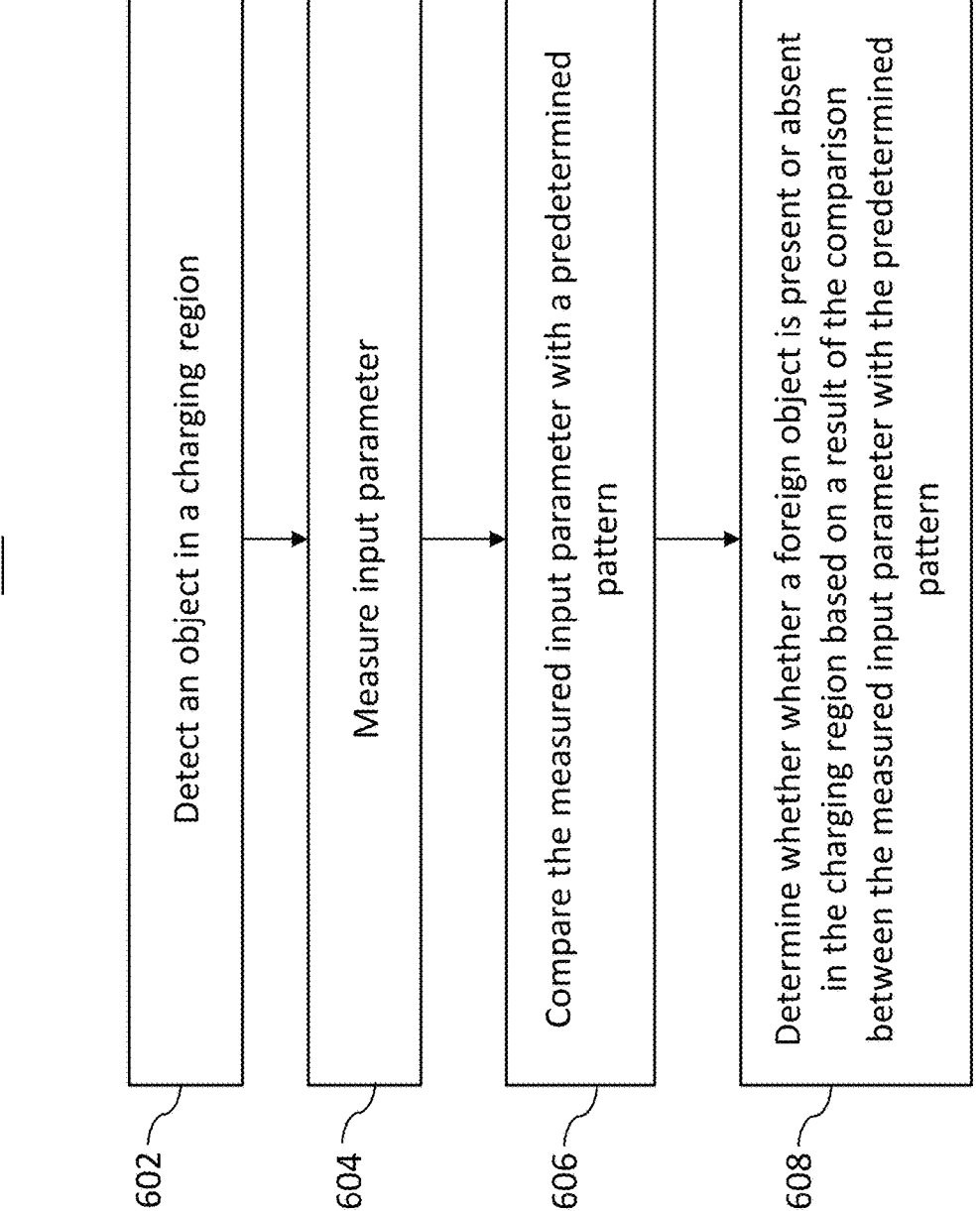
FIG. 6 is a flow diagram illustrating another process of implementing foreign object detection based on transmitter input parameter in one embodiment.

FIG. 6 is a flow diagram illustrating a process 600 being performed by a power transmitter to implement foreign object detection based on transmitter input parameter in one embodiment. The process 600 may include one or more operations, actions, or functions as illustrated by one or more of blocks 602, 604, 606, and/or 608. Although illustrated as discrete blocks, various blocks can be divided into additional blocks, combined into fewer blocks, eliminated, or performed in parallel, and/or performed in different order, depending on the desired implementation.

The process 600 can be performed by a wireless power transmitter (e.g., transmitter 102 in FIG. 1 to FIG. 3). In one embodiment, the blocks 602, 604, 606, and 608 can be performed prior to a power transfer stage between the wireless power transmitter and a wireless power receiver. The process 600 can begin at block 602. At block 602, the transmitter can detect an object in a charging region (e.g., charging region 122 in FIG. 1 to FIG. 4). In one embodiment, the transmitter can detect the object in the charging region by detecting the object being inductively coupled to the transmitter. The detection of the object can be performed in a stage that is different from a power transfer stage of the transmitter. The process 600 can proceed from block 602 to block 604. At block 604, the transmitter can measure an input parameter being received at an input terminal of the transmitter. In one embodiment, the input parameter can be one of an input current and an input power. The process 600 can proceed from block 604 to block 606. At block 606, the transmitter can compare the measured input parameter with a predetermined value, such as a known or predetermined pattern indicating a relationship between the input parameter and another parameter. For example, the known pattern can indicate one of a relationship between the input parameter and a distance between a foreign object and a reference location on the charging region, a relationship between the input parameter and an operating frequency of the transmitter, and a relationship between the input parameter and an input voltage of the transmitter. Further, the predetermined value can correspond to instances where no foreign object is detected in the charging region. The process 600 can proceed from block 606 to block 608. At block 608, the transmitter can determine whether a foreign object is present or absent in the charging region, or determine whether the object in charging region 122 is the foreign object or a wireless power receiver, based on a result of the comparison between the measured input parameter with the predetermined pattern. In one embodiment, in response to the result of the comparison indicating the measured input parameter is greater than the predetermined value, the transmitter can determine that the object is the foreign object. In response to the result of the comparison being less than the predetermined value, the transmitter can determine that the object is the receiver.

Figure 7:
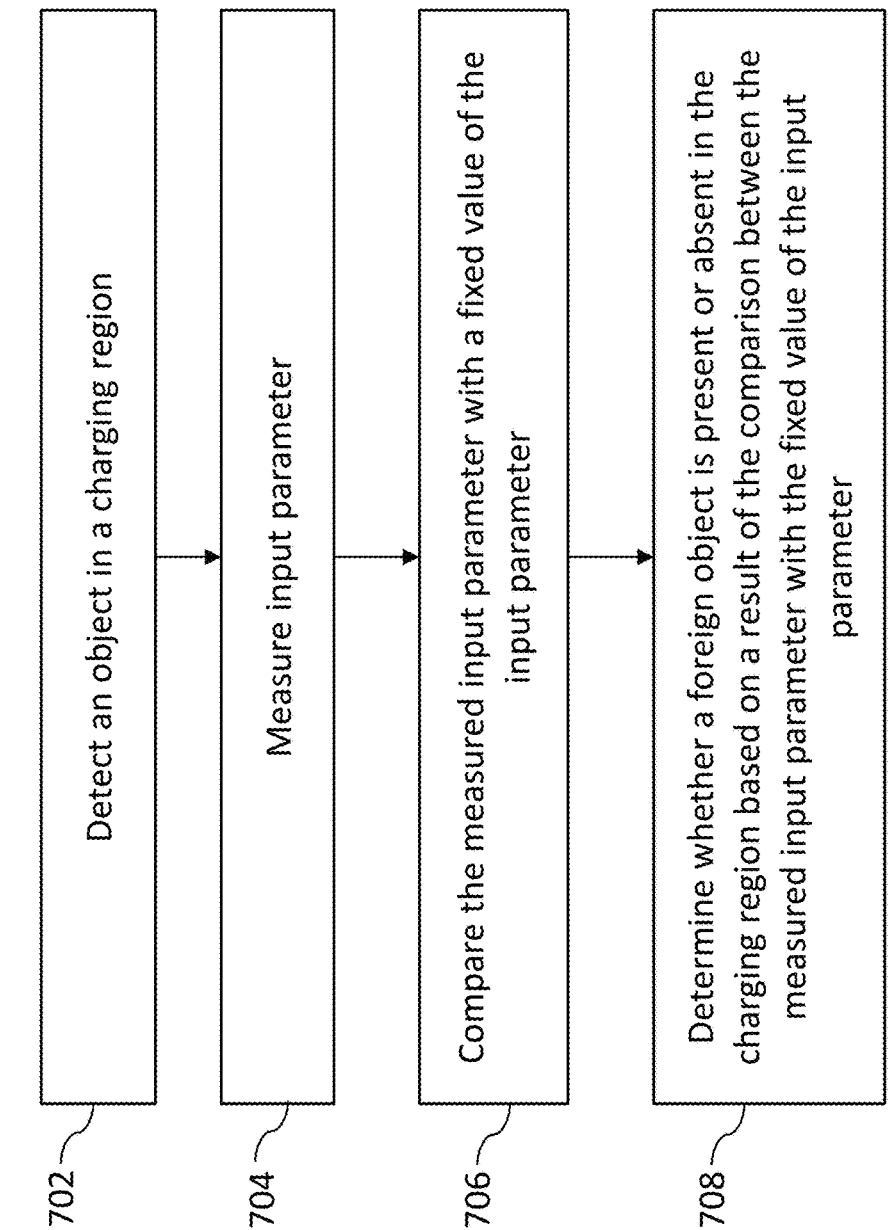
FIG. 7 is a flow diagram illustrating another process of implementing foreign object detection based on transmitter input parameter in one embodiment.

FIG. 7 is a flow diagram illustrating a process 700 being performed by a power transmitter to implement foreign object detection based on transmitter input parameter in one embodiment. The process 700 may include one or more operations, actions, or functions as illustrated by one or more of blocks 702, 704, 706, and/or 708. Although illustrated as discrete blocks, various blocks can be divided into additional blocks, combined into fewer blocks, eliminated, or performed in parallel, and/or performed in different order, depending on the desired implementation.

The process 700 can be performed by a wireless power transmitter (e.g., transmitter 102 in FIG. 1 to FIG. 3). In one embodiment, the blocks 702, 704, 706, and 708 can be performed prior to a power transfer stage between the wireless power transmitter and a wireless power receiver. The process 700 can begin at block 702. At block 702, the transmitter can detect an object in a charging region (e.g., charging region 122 in FIG. 1 to FIG. 4). In one embodiment, the transmitter can detect the object in the charging region by detecting the object being inductively coupled to the transmitter. The detection of the object can be performed in a stage that is different from a power transfer stage of the transmitter. The process 700 can proceed from block 702 to block 704. At block 704, the transmitter can measure an input parameter being received at an input terminal of the transmitter. In one embodiment, the input parameter can be one of an input current and an input power. The process 700 can proceed from block 704 to block 706. At block 706, the transmitter can compare the measured input parameter with a predetermined value, such as a fixed value of the input parameter. In one embodiment, the fixed value of the input parameter can be a fixed input current or a fixed input power measured by a controller of the transmitter when there are no foreign objects on the charging region. The process 700 can proceed from block 706 to block 708. At block 708, the transmitter can determine whether a foreign object is present or absent in the charging region, or determine whether the object in charging region 122 is the foreign object or a wireless power receiver, based on a result of the comparison between the measured input parameter with the fixed value of the input parameter. In one embodiment, in response to the result of the comparison indicating that the measured input parameter is different from the fixed value, the transmitter can determine that the object is the foreign object. In response to the result of the comparison indicating that the measured input parameter is same as the fixed value, the transmitter can determine that the object is the receiver.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device for wireless power-transmitting, comprising:
   a driver circuit configured to drive a transmitter coil to provide wireless power to a wireless power receiver; and
   a wireless power transmitter coupled to the driver circuit and configured to control the driver circuit, the wireless power transmitter configured to:
   detect an object inductively coupled to a wireless power transmitter;
   prior to a power transfer stage between the wireless power transmitter and the wireless power receiver, measure an input parameter, the input parameter being one of an input current and an input power;
   compare the measured input parameter with a predetermined value, wherein the predetermined value is a known or predetermined pattern indicating a relationship between the input parameter and another parameter;
   in response to the measured input parameter being greater than the predetermined value, determine that the object is the foreign object;
   in response to the measured input parameter being less than the predetermined value, determine that the object is the wireless power receiver;
   store a reference pattern;
   assign a difference between a minimum of reference pattern and a maximum of the predetermined value or a fixed value as a predetermined threshold range; and
   in response to a difference between the predetermined value and the input current is within predetermined threshold range, determine that no foreign object located in a charging region.

2. The semiconductor device according to claim 1, wherein the known or predetermined pattern indicates one of a relationship between the input parameter and a distance between the foreign object and a reference location on a charging region, a relationship between the input parameter and an operating frequency of the wireless power transmitter, and a relationship between the input parameter and an input voltage of the transmitter.

3. The semiconductor device according to claim 1, wherein the predetermined value corresponds to instances where no foreign object is detected in a charging region.

4. A method for operating a wireless power transmitter, the method comprising:
   detecting, by an integrated circuit, an object inductively coupled to the wireless power transmitter;
   prior to a power transfer stage between the wireless power transmitter and a wireless power receiver, measuring, by the integrated circuit, an input parameter, the input parameter being one of an input current and an input power;
   comparing, by the integrated circuit, the measured input parameter with a predetermined value, wherein the predetermined value is a known or predetermined pattern indicating a relationship between the input parameter and another parameter;
   in response to the measured input parameter being greater than the predetermined value, determine that the object is the foreign object, and in response to the measured input parameter being less than the predetermined value, determine that the object is the wireless power receiver;

storing a reference pattern;

assigning a difference between a minimum of reference pattern and a maximum of the predetermined value or a fixed value as a predetermined threshold range; and in response to a difference between the predetermined value and the input current is within predetermined threshold range, determining that no foreign object located in a charging region.

5. The method according to claim 4, wherein the known or predetermined pattern indicates one of a relationship between the input parameter and a distance between the foreign object and a reference location on a charging region, a relationship between the input parameter and an operating frequency of the wireless power transmitter, and a relationship between the input parameter and an input voltage of the transmitter.

6. The method according to claim 4, wherein the predetermined value corresponds to instances where no foreign object is detected in a charging region.

* * * * *